L. A. PETERSON & G. L. ANDERSSON.
METHOD OF CHAMFERING THE TEETH OF GEARS.
APPLICATION FILED MAY 24, 1915.
1,219,481.
Patented Mar. 20, 1917.
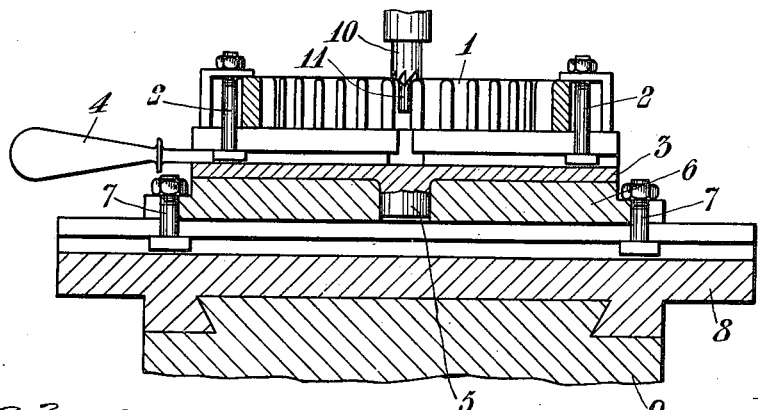
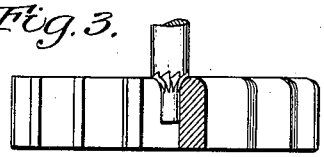
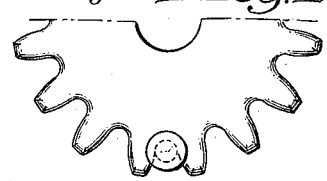
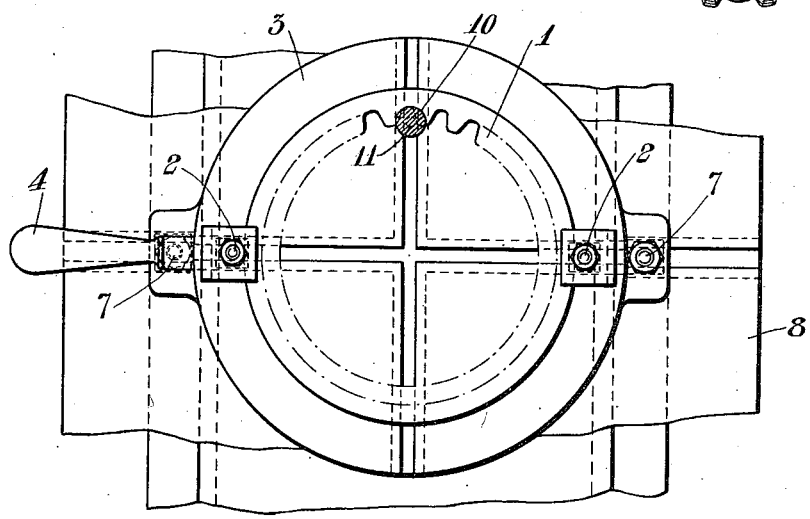

UNITED STATES PATENT OFFICE.

LARS AUGUST PETERSON AND GUSTAF LEANDER ANDERSSON, OF STOCKHOLM, SWEDEN.

METHOD OF CHAMFERING THE TEETH OF GEARS.

1,219,481.      Specification of Letters Patent.      Patented Mar. 20, 1917.

Application filed May 24, 1915. Serial No. 30,239.

*To all whom it may concern:*

Be it known that we, LARS AUGUST PETERSON and GUSTAF LEANDER ANDERSSON, subjects of the King of Sweden, and residents of Stockholm, in the Kingdom of Sweden, have invented new and useful Improvements in Methods of Chamfering the Teeth of Gears, of which the following is a specification.

This invention relates to a method of chamfering the teeth of gears.

In such gearings where for varying the ratio of gearing the gear-wheels may be shifted relatively to each other in such manner that different wheels may be made to mesh according to the greater or smaller ratio of gearing desired, as is usual for instance in automobile transmissions, the teeth are usually chamfered at the ends in order that the coupling together of the wheels may be made easy, that is to say, as much as possible without shocks, which would be felt very much if the ends of the teeth were square in the usual manner. Heretofore this chamfering of the teeth has mostly been done in a very primitive manner by merely filing, chiseling or in other manner removing the sharp edges on the ends of the teeth. The teeth become in this manner almost wedge-shaped at one end, which constitutes a very unfavorable departure from the regular form of tooth. Where machines have been employed this operation has been performed in such manner that the edges of two adjacent teeth have been cut away by means of a reamer or a countersink moved along the central line between the two teeth. Another method has been to cut the edges by means of a cutter moved along the same with its axis inclined relatively to the teeth.

This invention refers to a method of chamfering the teeth according to which the chamfer of the tooth may be given a shape which very minutely conforms to and follows the form of the tooth. By this the advantage is attained that the coupling together of the wheels is effected with as little shocks as possible and that all such irregularities in the form of tooth are avoided by which uneven wearing on the teeth and disadvantages caused thereby may ensue. In addition, the operation is very easy and may therefore be rapid and inexpensive.

Our invention is broadly characterized in that the chamfering or rounding of the edges of the teeth is made by means of a cutter provided with a central pivot or a pilot which during the operation rests against the side of the tooth in the longitudinal direction of the same and is moved along the profile of the tooth while the cutter treats the edge of the tooth.

In the accompanying drawing we have shown an embodiment of an apparatus for performing our improved method. Figure 1 shows the apparatus from the side and in vertical section, and Fig. 2 shows the apparatus viewed from above. Fig. 3 shows to a somewhat larger scale a gear about half the number of teeth of which have been treated according to our present method, and Fig. 4 shows a plan view of this gear.

1 represents the gear-wheel to be treated, secured by means of bolts 2 to a table 3 which may be turned on the pivot 5 by means of a handle 4. The pivot 5 turns in a member 6 which is secured by means of bolts 7 to a table 8 movable forward and backward on the table 9. By means of the handle 4 the gear-wheel may thus be turned during the operation and at the same time moved forward and backward.

Below the cutting portion the cutter 10 is provided with a guiding pivot 11 which during the operation is held against the side of the tooth and made to closely follow the profile of the tooth, while the gear-wheel is turned and moved in the manner described. One component of the pressure between the gear and the cutter is at right angles or normal to the profile of the tooth at the particular point of engagement therewith, the lateral depth of the cut being limited by the pivot 11 to the desired predetermined amount, which is therefore uniform throughout the periphery. When chamfering gear-wheels with straight teeth the axis of the cutter will, of course, be parallel with the axis of the wheel. If the teeth are helical the axis of the cutter will be inclined relatively to the axis of the wheel when chamfering the two sides as well as the top of the tooth. The cutter chamfers the teeth in such manner that the chamfer becomes perfectly uniform and even along the entire profile of the tooth. This will be understood by reference to Figs. 3 and 4, and particularly from the section of the tooth in Fig. 3, from which it is obvious that the chamfer will become uniform on any section normal to the profile of the tooth. The cutting edges of the cutter may preferably be curved (concave), as such a cutter will give rounded edges of the teeth, as illustrated, such teeth being less liable to break than where the cross section of the chamfer is a straight line which will always form corners with the side and the end surface of the tooth. The apparatus may, of course, be made in such manner that the turning and moving of the table 6 is effected automatically. Furthermore, although the gear moves and the cutter is relatively stationary we do not limit ourselves to this particular relative movement of the coöperating parts, except as defined by the claim.

We claim:

The method of chamfering the teeth of gear wheels, which consists in forcing a gear and a cutter, the latter of which converges to a central guiding pivot, and which rotates with its axis approximately parallel to the longitudinal direction of the tooth, against each other by pressure normal to the profile of the gear teeth at all points thereof and limiting the resulting relative movement of said parts to a uniform amount by means of said guiding pivot on the cutter resting against the side of the tooth and following the profile of the same.

LARS AUGUST PETERSON.
GUSTAF LEANDER ANDERSSON.

Witnesses:
FREDIK SCHMITCILÖW,
FRED. NORDSJD.